United States Patent
Mega et al.

(10) Patent No.: US 6,984,801 B2
(45) Date of Patent: Jan. 10, 2006

(54) METHOD OF CLOSING A HOLE IN A GAS TURBINE BLADE TOP BY LASER WELDING

(75) Inventors: Masahiko Mega, Hyogo-ken (JP); Koji Takahashi, Hyogo-ken (JP); Yoshitaka Uemura, Hyogo-ken (JP); Kengo Yamaguchi, Hyogo-ken (JP); Masaya Kanikawa, Hyogo-ken (JP); Syuho Tsubota, Hyogo-ken (JP); Ken Fujita, Hyogo-ken (JP); Toshihiko Tsunatani, Hyogo-ken (JP); Minoru Ohara, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/467,179

(22) PCT Filed: Aug. 29, 2002

(86) PCT No.: PCT/JP02/08730

§ 371 (c)(1),
(2), (4) Date: Apr. 27, 2004

(87) PCT Pub. No.: WO03/018976

PCT Pub. Date: Mar. 6, 2003

(65) Prior Publication Data

US 2004/0169022 A1    Sep. 2, 2004

(30) Foreign Application Priority Data

Aug. 29, 2001 (JP) .............................. 2001-260134

(51) Int. Cl.
B23K 26/20 (2006.01)
(52) U.S. Cl. ................................. 219/121.64
(58) Field of Classification Search ........... 219/121.63, 219/121.64
See application file for complete search history.

(56) References Cited

U.S. PATENT DOCUMENTS

| 4,960,973 | A | * | 10/1990 | Fouche et al. | ......... | 219/121.64 |
| 6,333,484 | B1 | * | 12/2001 | Foster et al. | ........... | 219/121.64 |
| 2004/0094523 | A1 | * | 5/2004 | Beck et al. | ............ | 219/121.64 |

FOREIGN PATENT DOCUMENTS

| EP | 0725214 | 8/1996 |
| EP | 1090710 | 4/2001 |

(Continued)

OTHER PUBLICATIONS

Kousa Miwa: "Basic and practice of gas turbine" Japan, Seizand Publication, p. 192, paragraph No. "8.4.2. Laser Machining Operation" Mar. 18, 1989 (with English abstract).
"Application of YAG laser welding for gas turbine blade" Kobe, Japan, Japan Welding Society Nov. 20, 2001-Nov. 22, 2001.

(Continued)

Primary Examiner—Geoffrey S. Evans
(74) Attorney, Agent, or Firm—Oblon, Spivak, McClelland, Maier & Neustadt, P.C.

(57) ABSTRACT

A tip plug is capped on a boss section so as to fit to a hole which is used for detaching a core which is formed in a blade tip section of the gas turbine blade. A butt-section T is melted so as to form a butt-welding section by using a YAG laser beam. Also, parameters such as an interval between the butt-section T, a member for forming the tip plug, condition for a laser welding operation, and a defocus position of the laser beam are optimized.

6 Claims, 7 Drawing Sheets

FOREIGN PATENT DOCUMENTS

| | | | |
|---|---|---|---|
| JP | 8-52512 A | * | 2/1986 |
| JP | 1-107973 | | 4/1989 |
| JP | 8-224679 A | * | 9/1996 |
| JP | 8-278029 | | 10/1996 |
| JP | 9-168927 | | 6/1997 |
| JP | 11-104866 | * | 4/1999 |
| JP | 2001-90502 | | 4/2001 |
| WO | 95/06540 | | 3/1995 |

OTHER PUBLICATIONS

First Symposim on High-Power Laser Macroprocessing, vol. 4831 Osaka, Japan, SPIE (The International Society for Optical Engineering) May 27, 2002-May 31, 2002.

"Application of YAG laser welding operation to Ni base super alloy" Preprints of the National Meeting of J.W.S. (Japan Welding Society), Apr. 22, 2002-Apr. 24, 2002.

* cited by examiner

METHOD OF CLOSING A HOLE IN A GAS TURBINE BLADE TOP BY LASER WELDING

TECHNICAL FIELD

The present invention relates to a method for plugging a hole on a tip of a gas turbine blade for detaching a core formed thereinside. The present invention relates to a method for plugging a hole on a tip of a gas turbine blade wherein it is possible to plug a hole reliably and the plugging operation is preferably efficient.

BACKGROUND ART

A gas turbine blade is exposed to a high temperature operation gas. Therefore, an Nickel-base super alloy which contains quite a few amount of Al and Ti is commonly used for a member for forming a gas turbine blade so as to enhance an anti-creeping characteristics which is caused under a high temperature condition. Also, for dealing with a super high temperature condition, it becomes more common that a directionally solidified coagulant and single crystal member are used so as to regulate a directivity of crystal growth in the single crystal member.

On the other hand, a method is used in which a cooling agent flows in a gas turbine blade (hereinafter called a turbine blade and a temperature which is loaded to the turbine blade is maintained in a lower temperature.

According to such a method, coolant paths which expand in a longitudinal direction (in a vertical direction) in the turbine blade are formed such that a plurality of coolant paths are formed in a plurality of channels in a width direction of the turbine blade, the coolant agent returns at a section where the neighboring channels communicate each other at an end of the turbine blade; thus, a channel or a plurality of channels are formed in a winding manner.

Figure 9:
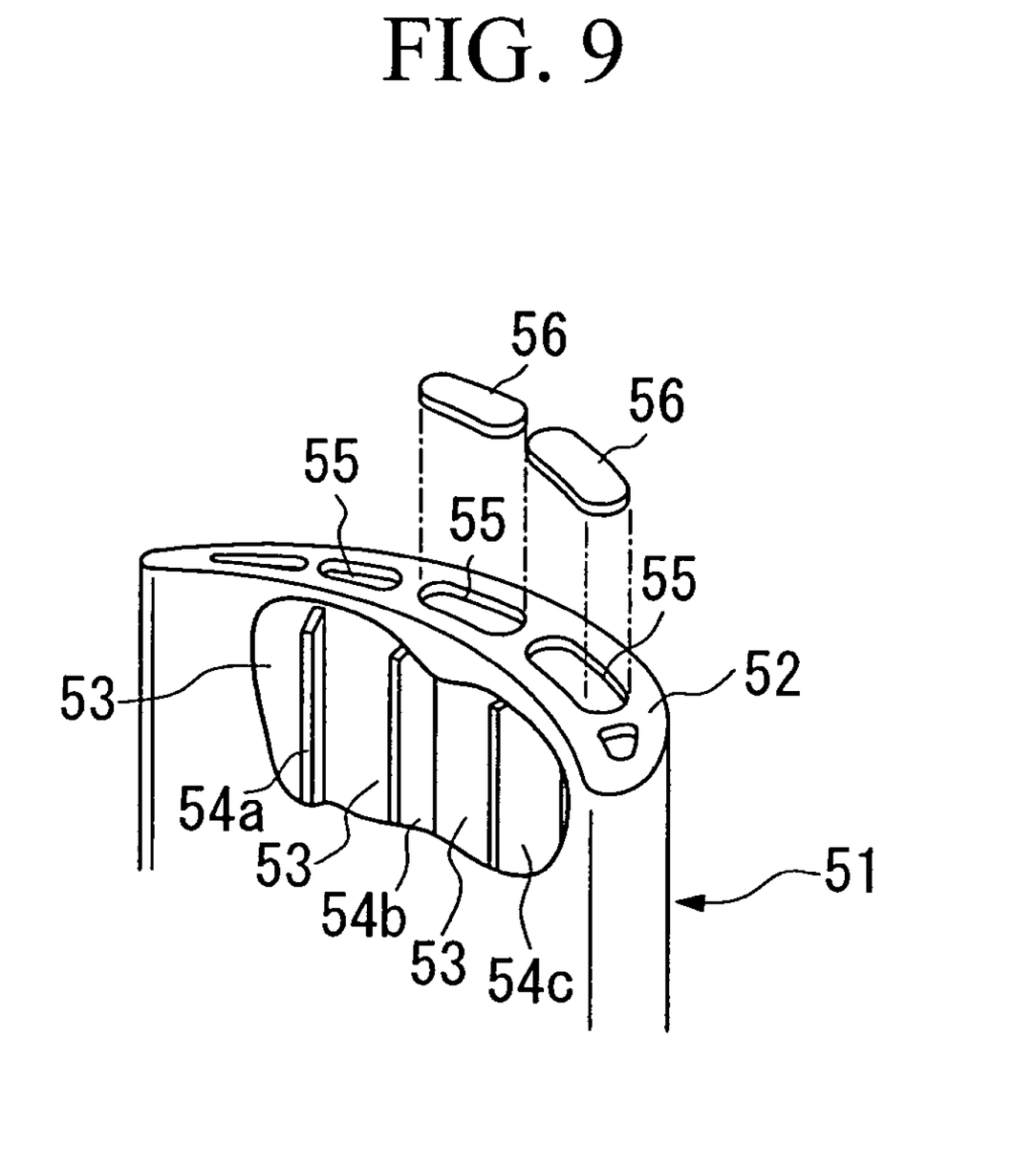
FIG. 9 is a perspective view showing an inside part of the gas turbine blade.

That is, as shown in an isometric view for showing a part of a gas turbine blade in FIG. 9, a plurality of coolant paths 53, 53, 53 which expand toward a blade tip section 52 in a longitudinal direction (vertical direction) are separated by separating walls 54a, 54b, and 54c inside a turbine blade main body 51. A coolant agent returns at an end of the blade where the neighboring channels 53, 53 communicate each other; thus, the coolant agent flows in a winding manner so as to make use of its cooling characteristics.

The turbine blade main body 51 having such a structure is formed by a casting operation while forming a hole 55 for detaching a plurality of cores in a blade tip section 52. The hole 55 is plugged to a tip plug 56 having a corresponding shape to the hole 55 by a tungsten inert-gas arc welding (hereinafter called a TIG welding).

However, when the tip plug 56 is welded to the hole 55 formed on the blade tip section 52 in a TIG welding operation, there are problems in that it is difficult for edge preparation for the welding operation because it is complicated, skill and experience are necessary for the welding operation, and the cost for welding operation increases easily.

Also, in addition, for restricting a solidification cracking and liquation cracking in a post-welded area on a base member for a blade, a method in which a lid is attached on the blade tip on a significant part of the blade and a plug is welded to the blade tip section by using a laser beam is used. Also, a method for a gas turbine blade in which a lid is welded to the blade tip section is used. These methods are not described with reference to drawings in the present specification. According to these methods, the welding operation is conducted throughout the entire plug; therefore, a condition in the finished surface depends on factors such as a roughness and color on a plug surface. Also, it is not possible to control a space between a plug and a bottom plate section (55a in FIG. 3); thus, there are problems in that a melting depth alters, and to a matter worse, a crack occurs on the welded section.

DISCLOSURE OF INVENTION

The present invention was made in consideration of the above problems. An object of the present invention is to provide a method for plugging a hole on a gas turbine blade tip such that it is possible to produce a final product repeatedly in a uniform quality by improving an efficiency for plugging hole on a tip of a turbine blade main body by a tip plug in a laser welding method in which high temperature heating area is narrow and an energy density is high.

In order to solve the above problems, a first aspect of the present invention may be a method for plugging a hole on a tip of a gas turbine blade which comprises steps of fitting a tip plug in a hole formed on a tip of the turbine blade, performing a butt-weld at a butting section by a tip plug and the tip of the turbine blade by using a laser beam: and plugging the hole.

A second aspect of the present invention may be a method for plugging a hole on a tip of a gas turbine blade in which a space in a butting section between the hole and the tip plug is no more than 0.2 mm.

A third aspect of the present invention may be a method for plugging a hole on a tip of a gas turbine blade in which the tip plug is made of a Ni-base super alloy Inconel 625 member.

A fourth aspect of the present invention may be a method for plugging a hole on a tip of a gas turbine blade in which a condition for butt-welding is such as output: 500 to 900 W, pulse width 10 to 15 ms, repetition time: 30 to 60 pps, Duty 30 to 90%, velocity: 0.5 to 1.3 m/min, and entering heat 34 to 60 kJ/m.

A fifth aspect of the present invention may be a method for plugging a hole on a tip of a gas turbine blade in which a defocusing amount of the laser beam is 0 to −1.0 mm in a butt-welding operation for welding a tip plug on a hole by a laser beam.

A sixth aspect of the present invention may be a method for plugging a hole on a tip of a gas turbine blade in which the laser beam is a YAG laser beam, and an Argon gas is used for a shield gas.

BEST MODE FOR CARRYING OUT THE INVENTION

Figure 1:
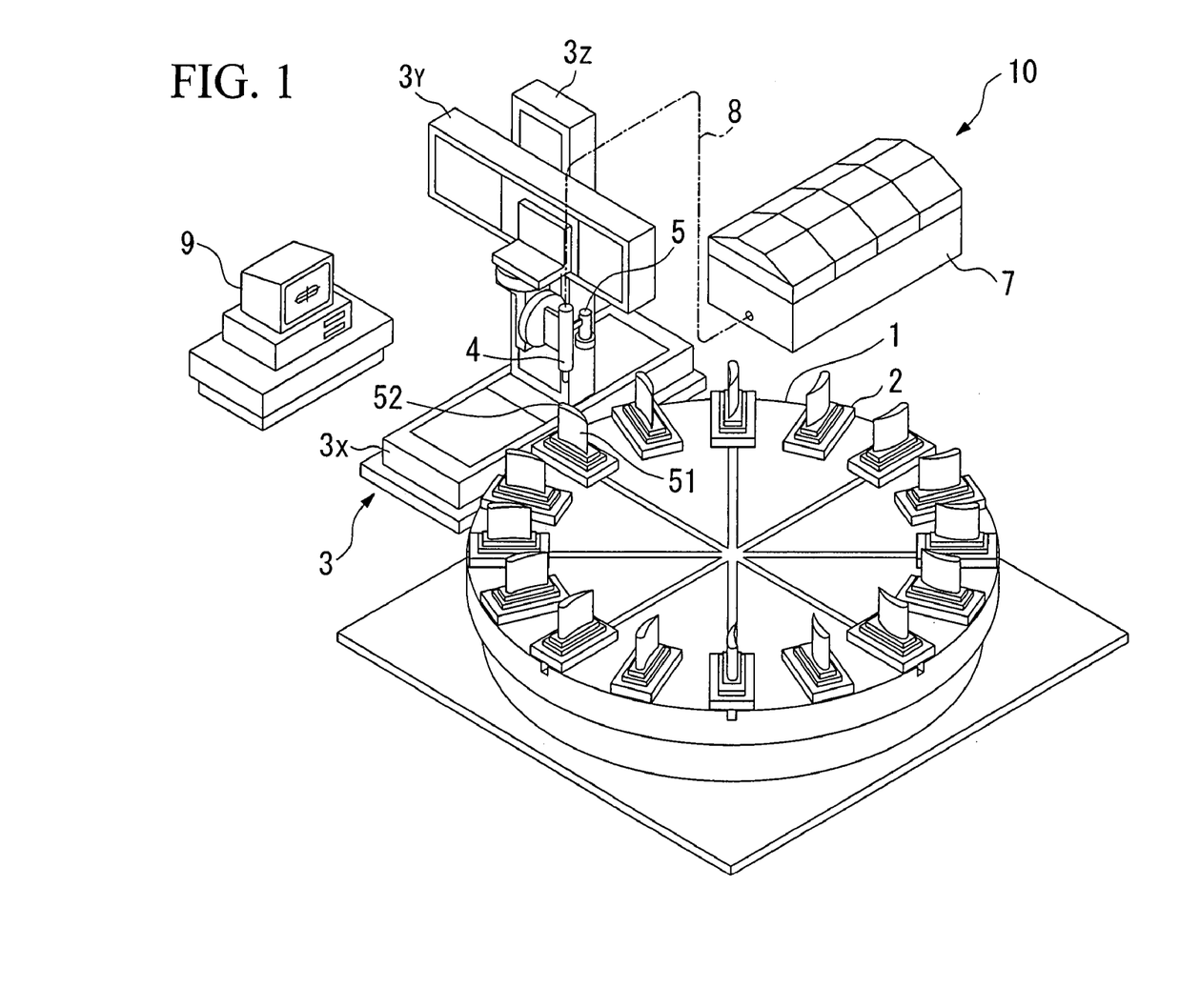
FIG. 1 shows a laser welding device for plugging a hole formed on a blade tip section on a gas turbine blade according to the present invention.

Method for plugging a hole formed on a tip of the gas turbine blade is performed in such a way that a tip plug is welded on a hole on a tip of a turbine blade by a butt-welding operation by using a laser welding device for plugging a hole shown in FIG. 1.

As shown in FIG. 1, in a laser welding device (for example, a laser oscillator) 10 for plugging a hole on a turbine blade tip, a rotation table 10 is rotated at a predetermined constant angle intermittently by a driving device which is not shown in the drawing. A plurality of fixtures 2 are disposed on an upper surface of the rotation table 1 so as to correspond to the above predetermined constant intermittent angle. A blade main body is fixed on each fixture 2 such that a blade tip section 52 is disposed upwardly. Reference numeral 3 indicates a welding head driving device which is disposed near an outer periphery of the rotation table 1. The welding head driving device 3 is provided with an X-axis driving section 3X, a Y-axis driving section 3Y, and a Z-axis driving section 3Z so as to support the welding device which is mainly formed by a welding head 4 so as to freely move the welding device in a three-dimensional manner.

The welding head which is supported by the welding head driving device 3 is provided with an optical system which focuses a laser beam which is sent from the optical fiber 8 and an ejection nozzle for an inert gas which protects the welding section from being oxidized. A tip of the welding head 4 is disposed so as to face the blade tip section 52 on the blade main body 51 so as to freely move therearound.

A camera device 5 for monitoring a blade tip section 52 is disposed near the welding head 4 on the blade main body 51 in a perspective of the camera device 5 in a certain distance therefrom.

Reference numeral 7 indicates a welding operation device which is provided with a laser oscillator for supplying a laser beam to the welding head 4. The welding operation device 7 supplies the laser beam to the welding head 4 via the optical fiber 8.

Also, reference numeral 9 indicates a control device which is disposed so as to neighbor the welding head driving device 3. The control device 9 transmits a data which is taken by the camera device 5 via a transmission path (which is not shown in the drawing) and performs a position correction operation for the picked-up image by performing an image processing operation using a predetermined mark which is drawn on the tip plug 56 so as to control the movement of the welding head 4 by putting out the result to the welding head driving device 3.

A laser welding device for plugging a hole having such structures seals a hole formed on the blade tip section 52 according to following manner.

A tip plug is fit to a hole 55 which is formed on the blade tip section 52 on the blade main body 51. Simultaneously, the tip plug 56 is welded temporarily according to necessity. In a plurality of blade main body 51, base sections of the blade main body 51 is fixed by a fixture 2 so as to be supported on the rotation table 1.

Consequently, an image of the tip plug 56 is picked up by a camera device 5 from upward of a predetermined tip plug 56 among a plurality of tip plugs 56 which are disposed on the blade tip section 52 of the blade main body 51 near the welding head driving device 3. An information for the picked-up image is transmitted to the control device 9; thus, an inclination of the tip plug 56 according to a certain reference and a shift amount from the central position of the tip plug 56 are calculated.

A welding track which corresponds to a shape of the tip plug 56 which is memorized in the control device 9 such as a welding track which is set according to a fitting line of a tip plug which is fitted to the hole 55 on the blade tip section 52 is automatically adjusted to the inclination of the tip plug 56 which is calculated according to the information about the picked-up image of the tip plug and a shift amount of the central position.

As a result, the welding track which is adjusted by the control device 9 coincides to a true shape of the tip plug 56 which is picked up by the camera device 5. The welding head 4 moves along the welding track; thus the predetermined tip plug 56 is welded in the laser welding operation.

After a hole 55 among a plurality of holes 55 on the blade tip section 52 of the blade main body 51 is plugged by the tip plug 56 in this way, the rest of the holes 55 remaining on the blade tip section 52 are plugged in a similar manner. After a plurality of holes 55 on the blade tip section 52 on a blade main body 51 are plugged by the tip plugs 56, or after a part of a plurality of holes 55 are plugged in the welding operation, the rotation table 1 is rotated by one pitch such that a next blade main body is disposed to be positioned at a next welding operation; thus, a laser welding operation is performed in a similar manner.

Also, according to a method for plugging a hole according to the present invention, it is possible to use a device which is provided with a a free-flow conveyor, a work changer, and a driving system for welding operation in addition to a device which is provided with a rotation table as described in FIG. 1.

Figure 2:
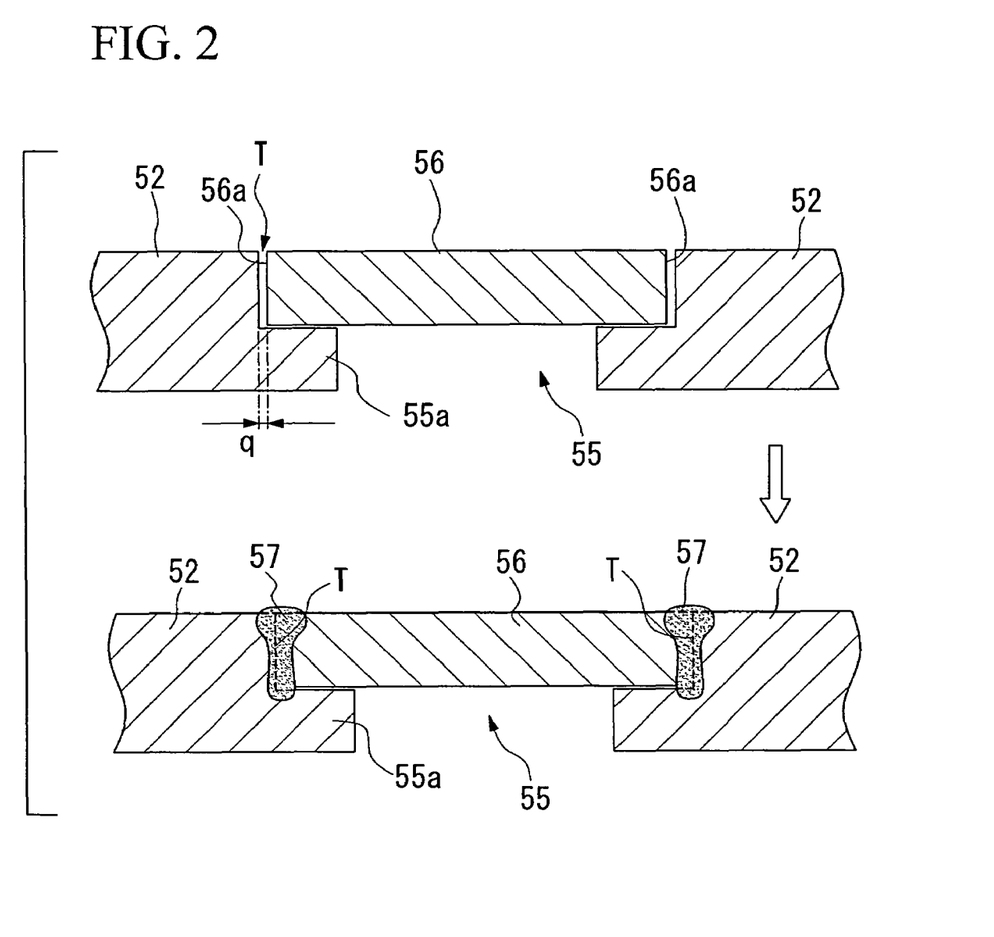
FIG. 2 is a cross section showing a part of welding condition between a tip plug 56 to a hole 55 formed on a blade tip section according to the present invention.

In such a welding operation, as shown in FIG. 2 in detail, a tip plug 56 is capped on a protruding boss section 55a which is formed on a periphery of the hole 55 on the tip blade 52 of the blade main body 51, the tip plug 56 is fitted to the hole 55; thus a butting section T is formed on the periphery of the hole 55 and the periphery section 56a of the tip plug 56. Next, the butting section T is welded by performing a butt-welding operation by using a YAG laser beam; thus, a butt-welding section 57 is formed. In such a case, it is preferable that an inert gas such as an argon gas is supplied for shielding the welding sections so as to prevent the metals in the welding sections from being oxidized.

The hole 55 on the blade tip section 52 is plugged by the tip plug 56 by performing a laser butt-welding operation in this way; thus, it is possible to realize a long and thin bead under condition that the width of the bead in the butt-welding section 57 is narrow and the melting depth is deep. Therefore, it is possible to reduce a temperature area in which there is a concern of high temperature crack. Also, it is possible to decrease the entering heat amount; thus, it is possible to reduce occurrence of a solidification cracking and a liquation cracking. In particular, it is preferable that the minimum bead width in the butt-welding section 57 is no more than 1.5 mm. Also, it is preferable that a fitting space q in the butt-welding section T is no more than 0.1 mm in an embodiment shown in FIG. 2. Also, it is preferable that the fitting space q is no more than 0.2 mm in an embodiment in which the plug tip 56 is disposed in one portion of the hole 55 partially.

Also, the butt-welding section 57 which is formed in such a butt-welding operation receives a stress in a vertical direction in accordance with a length of the blade of the blade main body in a direction in which the butt-welding section 57 is pulled. In contrast, in an attaching welding operation, a stress which is equivalent to the above stress is received in a shearing direction; thus, the strength against the stress is stronger in the butt-welding operation than in the attaching welding operation.

When a turbine blade section is broken because of thermal stress caused by a start and stop of the gas turbine and a thermal fatigue which is caused by the above thermal stress, a crack occurs in the tip of the turbine blade section in a longitudinal direction of the blade. Thus, it is understood that most of the stress is in a longitudinal direction of the blade, and it is important that the turbine blade has strength in this direction. Also, the turbine tip section is under high temperature condition; thus, there is a problem of creeping which is caused by a gas internal pressure and centrifugal force. In a method according to the present invention, the hole 55 is plugged by a tip plug 56 having a minimum dimension; thus, the weight of the tip plug is very small and there hardly occurs a problem of creeping. In contrast, in a case in which a hole is plugged by a piece of tip plug or a plurality of holes are plugged by a piece of tip plug and welded under attached condition by a laser welding operation, the tip plug becomes bigger and a span between the attached sections becomes longer; thus, such a structure is weak under a creeping condition.

Next, a preferable example of welding condition for welding the hole 55 on the blade tip section 52 and the tip plug by performing a laser butt-welding operation is explained.

Welding conditions are determined according to following conditions.

A device which is formed by supplying a YAG laser having 1.2 kW of output, an SI optical fiber having 0.6 mm of core diameter, and an optical system having 80 mm of a focal length is used for a laser oscillator.

Output of the laser alters according to following basic output condition so as to maintain a necessary melting depth and reduce the entering heat such as:

pulse width (a): 12.5 ms, Duty (a/b×100): 50%, repetition (1/b): 40 pps.

Figure 3:
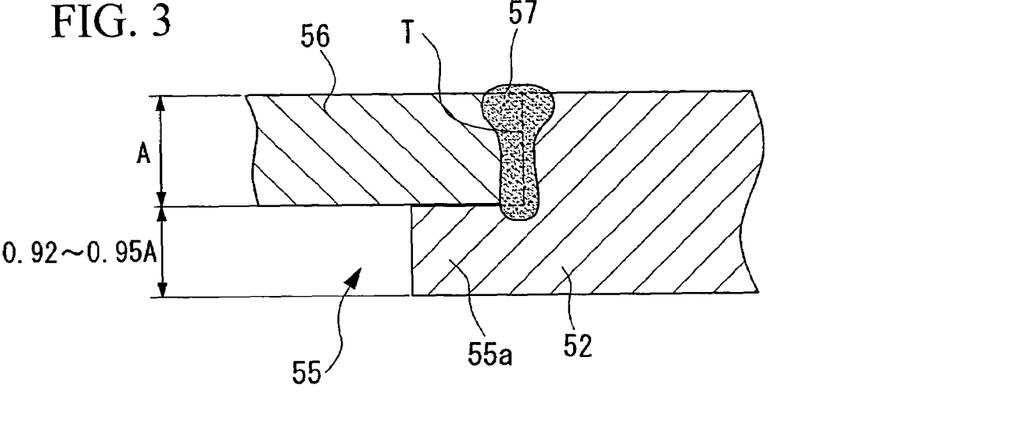
FIG. 3 is a cross section showing a butt-welding section of a tip plug in a test for determining appropriate welding condition.

The butt-welding section 57 for the tip plug is formed so as to have a cross section shown in FIG. 3. Thickness A mm of the tip plug is penetrated. Welding operation is arranged so as to have sufficient tolerance such that the melting depth is within an approximate range of 1.25 A mm and 1.56 A mm and an excessive amount of energy is not supplied to a back side thereof if the thickness in the protruding boss section 55a is 0.92 A to 0.95 A mm. Here, argon gas is used for a shielding gas.

Factors such as (1) a preferable relationship between an output and welding speed, (2) an influence by a defocusing operation are examined according to the above conditions.

<(1) Preferable Relationship Between the Output and the Melding Speed>

Influence for a welding condition due to the output and the welding speed is shown in TABLE 1. Here, a test piece for the tip plug is under condition of the same shape as that of the true blade. If the test piece is in the true blade shape, it is indicated as "blade shape" in the table.

Also, here, a focal point of the laser beam is not defocused. That is, following data is obtained under focused condition. The welding condition was evaluated in accordance with a standard such as whether or not the melting depth is approximately 1.25 to 1.56 times as thick as that of the tip plug. Here, in the TABLE 1, "○" indicates preferable. "Δ" indicates no defect. "x" indicates a defect.

TABLE 1

| Output [W] | Speed [m/min] | Entering Heat Amount [J/cm] | Melting Depth [mm] | Bead Spike Shape | Result | Note |
|---|---|---|---|---|---|---|
| 1060 | 1.6 | 398 | ○2.3 | X | Δ | |
| 980 | 1.4 | 420 | ○2.3 | Δ | Δ | |
| 890 | 1.0 | 534 | ○2.5 | ○ | ○ | |
| 890 | 1.2 | 445 | ○2.3 | ○ | ○ | |
| 890 | 1.4 | 381 | ○2.1 | Δ | Δ | |
| 890 | 1.5 | 356 | ○2.1 | X | Δ | Blade Shape TP |
| 800 | 0.8 | 600 | ○2.5 | ○ | ○ | |
| 800 | 1.0 | 480 | ○2.3 | ○ | ○ | |
| 800 | 1.0 | 480 | ○2.3 | ○ | ○ | Blade Shape TP |
| 800 | 1.2 | 400 | ○2.1 | ○ | ○ | |
| 800 | 1.4 | 343 | ○2.0 | Δ | Δ | Blade Shape TP |
| 650 | 0.6 | 600 | ○2.2 | ○ | ○ | |
| 650 | 0.8 | 488 | ○2.1 | ○ | ○ | |
| 650 | 1.0 | 390 | ○2.0 | ○ | ○ | |
| 650 | 1.1 | 355 | Δ1.9 | ○ | Δ | Blade Shape TP |
| 540 | 0.6 | 540 | ○2.0 | ○ | Δ | |
| 540 | 0.75 | 432 | Δ1.9 | ○ | Δ | Blade Shape TP |
| 510 | 0.6 | 510 | Δ1.9 | ○ | Δ | |
| 495 | 0.4 | 743 | Δ1.9 | ○ | Δ | Many Blow Holes |
| 460 | 0.4 | 690 | Δ1.8 | ○ | Δ | Many Blow Holes |
| 460 | 0.55 | 502 | Δ1.8 | ○ | Δ | Blade Shape TP |

Figure 4:
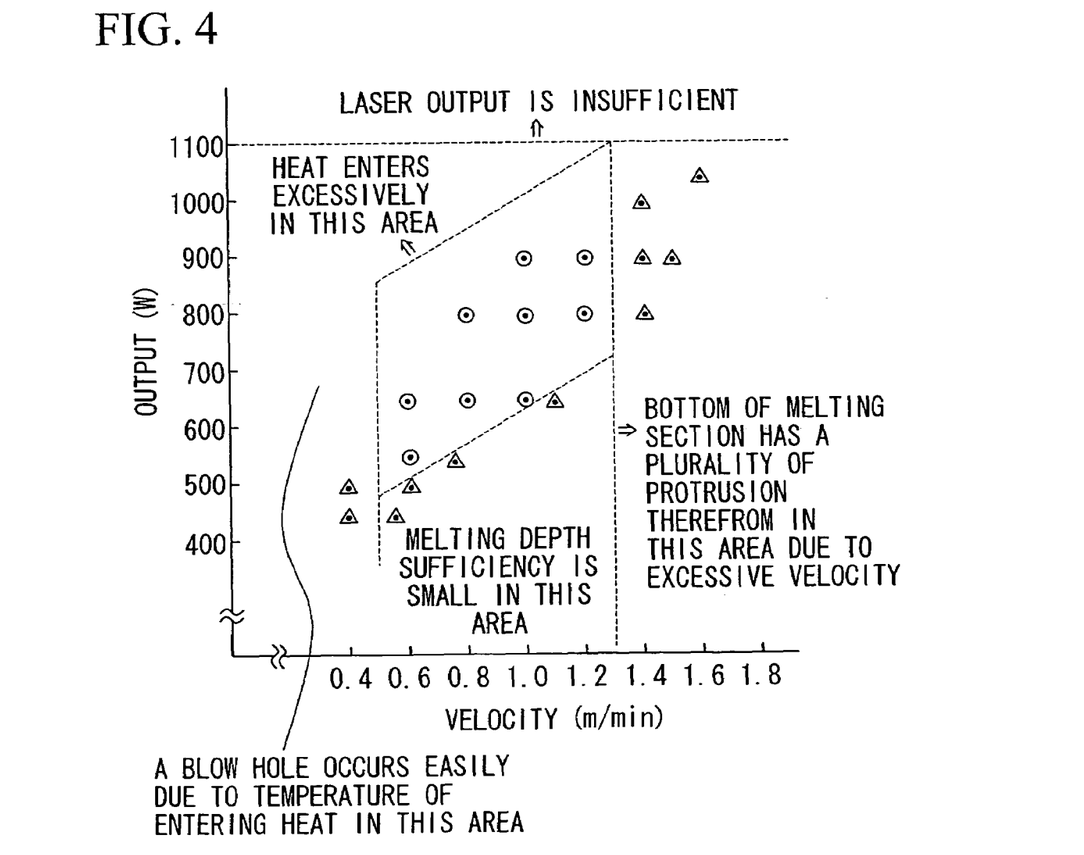
FIG. 4 is a graph showing a result of welding condition with reference to a welding velocity (m/min) and an output (W).

A graph shown in FIG. 4 shows the above result so as to show an influence of combination of [Melting Speed (m/min) and Output (W)] to a welding condition under condition that a horizontal axis indicates a melting speed (m/min) and a vertical axis indicates an output (W).

According to the TABLE 1 and FIG. 4, it is confirmed that it is necessary that a preferable condition for a laser butt-welding operation according to the present invention is 0.5 to 1.3 m/min of melting speed and the output should be in a range of 500 to 900 W. Also, it is confirmed that the entering heat amount should be in a range of 34 to 60 kJ/m.

According to these results, it is possible to propose that an example for a preferable welding condition is such as 550 W (pulse width: 12.5 ms, Duty: 50%, and repetition: 40 pps) melting speed: 0.6 m/min.

Furthermore, influence due to changes in the pulse width in the laser beam, Duty, and the repetition to the welding condition is examined. As a result, a preferable butt-welding operation is realized under condition that factors change within following ranges such as the pulse width: 10 to 15 ms, Dury: 30 to 90% and repetition: 30 to 60 pps.

<(2) Influence by Defocusing Operation>

Next, an influence of a defocus amount LF in a focal point in an optical system to the welding condition is evaluated. In this evaluation, a change in the melting depth (mm) due to a change in the defocus amount Lf in the focal point is examined by using a stainless metal member. Such a welding condition is confirmed as a preferable condition for the laser butt-welding operation.

Following welding condition is employed such as output: 550 W (pulse width: 12.5 ms, Duty: 50%, repetition: 40 pps) welding speed: 0.6 m/min.

Figure 5:
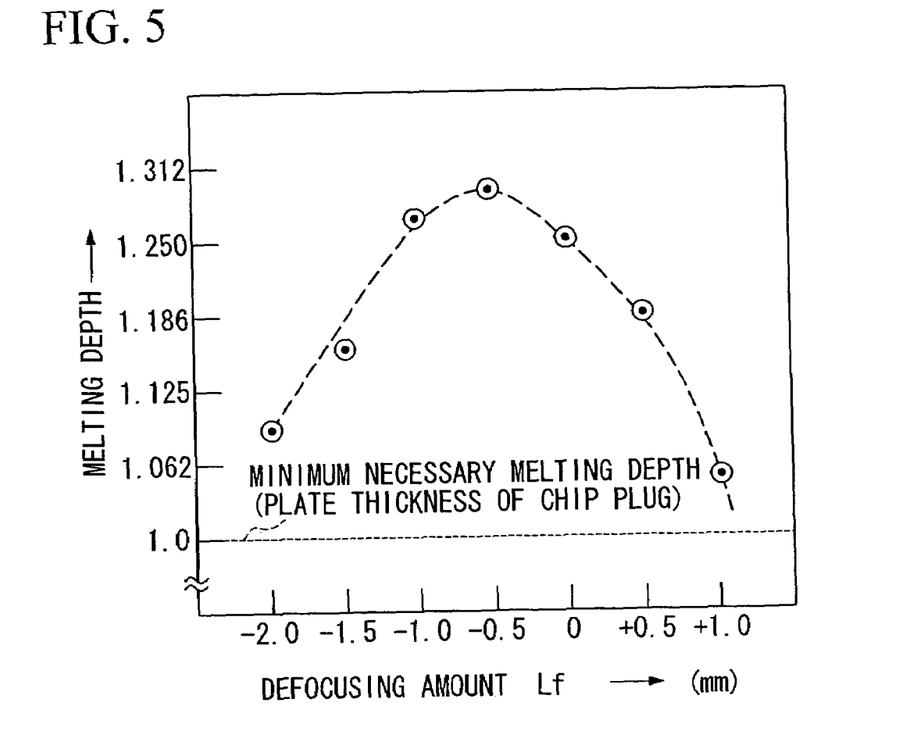
FIG. 5 is a graph showing a relationship between a defocusing amount Lf (mm) and a melting depth (mm).

A graph shown in FIG. 5 shows the result of relationship between the defocusing amount Lf (mm) in the focal point and the melting depth (mm).

In the present invention, the defocus amount indicates a shift amount between the position of the focal point in an optical system which is manufactured and a surface of object which is welded. The defocus amount is 0 (zero) when the position of the focal point in an optical system which is manufactured and a surface of object which is welded coincide. The defocus amount is indicated minus under condition that a position of the focal point in the optical system is more inner than a surface of an object which is welded.

According to FIG. 5, following facts are confirmed.

① The defocus amount Lf by which the maximum melting depth can be realized is −0.5 mm.

② Difference in the melting depth between conditions such as preferable focus point position Lf=0 mm and defocus amount Lf=−0.5 mm is so small that similar welding condition can be realized under both conditions.

③ Sufficient defocus amount for realizing a minimum necessary melting depth is Lf=±1.5 mm.

According to the above facts, similar result for the melting depth is realized when the welding operation is performed under conditions such as Lf of the butt-welding section 57 in the tip plug=0 mm, −0.5 mm, and −1.0 mm respectively.

In the laser butt-welding operation according to the present invention, it is preferable that the welding operation is performed under the above conditions. In addition, in order to restrict the occurrence of the solidification cracking in the welding section, a member which has more superior welding characteristics than a base member of the turbine blade main body 51 for a tip plug 56 which plugs the hole 55 on the blade tip section 52 on the gas turbine blade main body 51. Also, it is necessary that the laser beam is precisely disposed in a border line between the base member for the blade tip section 52 of the turbine blade main body 51 in the butt-welding section 57 and the tip plug 56 such that dilution ratio of the base member for the blade tip section 52 of the turbine blade main body 51 in the butt-welding section 57 and the dilution ratio of the tip plug 56 should be approximately 50%.

Here, the dilution ration can be defined such as [Area of melting section in the base member for the blade tip section]/ [Area of melting section in the base member for the blade tip section+Area of melting section in the tip plug].

For a member for a tip plug 56 which has more preferable welding characteristics than that of a base member for the above blade tip section 52, alloys such as a Nickel-base super alloy Inconel 625 (Cr: 21 to 23 weight %, Mo: 8 to 10 weight %, the rest of the alloy is Ni, Inconel is a Trademark registered by Inconel Corp.) which contains very few Al and Ti which do not contain can be named in contrast to a fact in which a Nickel-base super alloy Inconel 738 (Al: 3.5 weight %, Ti: 3.2 weight %, the rest of the alloy is Ni) which is quite commonly used for a member for the turbine blade base body 51. When the welding operation is performed under condition that such a Nickel-base super alloy Inconel 625 is used for the tip plug 56 and a dilution ratio is 50%, a welding metal section enters a possible welding area. Thus, it is possible to prevent the solidification cracking by diluting the member for the blade tip section 52 in the turbine blade main body 51 and the tip plug 56.

Figure 6:
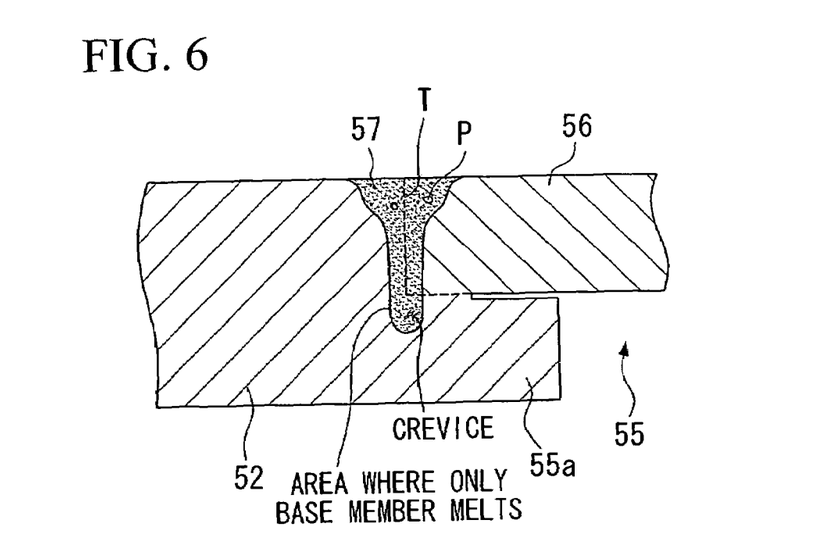
FIG. 6 is a cross section graphically showing a welded metal section in which a tip plug 56 is welded to a hole 55 on the blade tip section 52 under condition of 50% of dilution ratio.

In FIG. 6, a cross section in a welding metal section is shown in which a tip plug 56 is welded to a hole 55 on a blade tip section 52 on the turbine blade main body 51 made of Inconel 738 by performing a butt-welding operation with 50% of dilution ratio by using a Nickel-base super alloy Inconel 625 for a tip plug 56. In this case, a tip plug 56 is capped on a protruding boss section 55a which is formed on the hole 55 and fitted thereto by performing a laser welding operation. Small porosity p having no more than 0.25 mm of diameter is found in a butt-welding section in the welding metal section. Even though a crack occurs, it remains in the base member (boss section 55a in the hole 55) for the blade tip section 52; thus, a crack does not occur in the tip plug 56.

In the remaining stress in a welded section, a liquefaction crack which occurs in a heat-affected zone (hereinafter called "HAZ" ) caused in a heating operation for the base member for the blade tip section 52 is large in a welding direction. Therefore, such a liquation cracking occurs radially with respect to the bead. However, the liquefaction crack does not grow against the stress which is applied to the tip plug 56. As a result, the strength in the welded metal is weaker than the strength in the tip blade; thus, such a crack occurs inside of the welded metal. That is, such a crack does not affect the strength in the entire structure of the turbine blade substantially even if a fine HAZ crack occurs.

Here, in order to confine such a fine crack, it is effective to cool the turbine blade main body by using an air-cooling structure or a water-cooling structure during the welding operation so as to complement the insufficiency for the heat capacity.

(Embodiment)

Figure 7A:
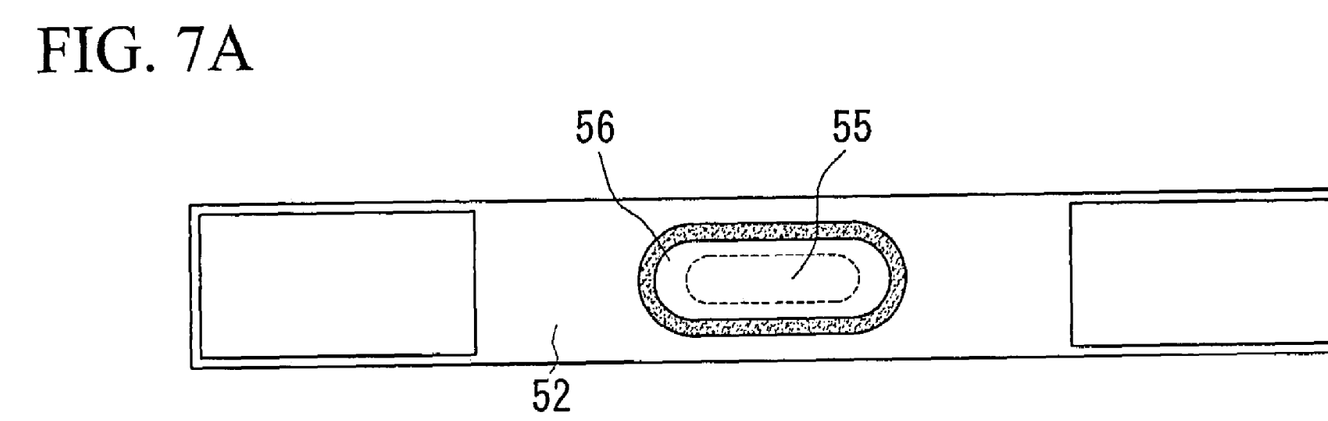
FIGS. 7A and 7B are views for explaining fatigue tests for the welded section obtained in the embodiments according to a method for plugging a hole formed on the turbine blade in the present invention.
Figure 7B:
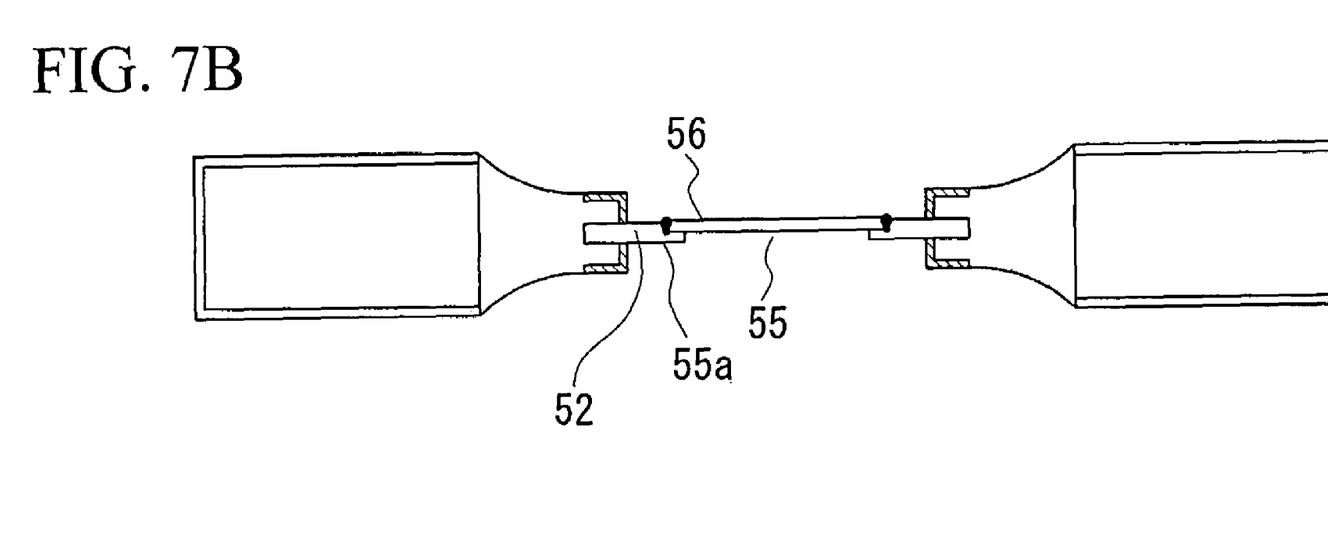

In an embodiment according to the present invention, a hole 55 on the blade tip section 52 of the turbine blade main body 51 formed by MGA1400DS member is plugged by the tip plug 56 made of a Nickel-base super alloy Inconel 625 by performing a YAG laser butt-welding operation in such a manner as shown in FIGS. 7A and 7B. Parameters in this embodiment are as follows.

<Specification for the Blade Tip Section 52>

Member for forming the blade tip section 52: MGA1400DS

Shape of Hole 55: Oval

<Parameters for the Tip Plug 56>

Member for forming the tip plug 56: Nickel-base super alloy Inconel 625

Shape of Tip Plug 56: Oval Plate

A tip plug 56 made according to the above specification is put on a protruding boss section 55a on the hole 55 and fitted to the hole 55 for testing a fatigue strength in such a manner as shown in FIGS. 7A (plan view) and 7B (side view). Furthermore, a laser butt-welding operation is performed under the above condition. Here, the welding condition is set to be the above preferable condition. The rest of the parameters are as follows.

<Parameters for the Welding Condition>

Welding Device: A device which is formed by assembling an SI optical fiber having 0.6 mm of core diameter and an optical system having 80 mm of focal length is used for a YAG laser oscillator having 1.2 kW of output. Other conditions are such as output: 800 W, pulse width: 12.5 ms, Duty: 50%, repetition 40 pps, defocusing amount Lf: −0.5 mm, welding speed: 1.0 m/min, entering heat amount: 480 J/cm.

As explained above, a hole 55 is plugged by a tip plug 56 by performing a laser butt-welding operation. Fatigue strength in such a welded member is tested in manners shown in FIGS. 7A and 7B. In this fatigue strength test, a crack and penetration fatigue life Nf (cycle) against a load stress $\Delta\sigma$ (kgf/mm$^2$) is measured.

<Parameters for the Test>

Test Temperature: 900° C.

Load Stress $\Delta\sigma$: 30, 33 (kgf/mm$^2$)

Load Frequency of the above Load Stress: 0.2 to 1 Hz

Test is conducted according to the above test parameters. A crack and penetration fatigue life Nf (cycle) against a load stress $\Delta\sigma$ (kgf/mm$^2$) is measured in the load applying cycle.

Figure 8:
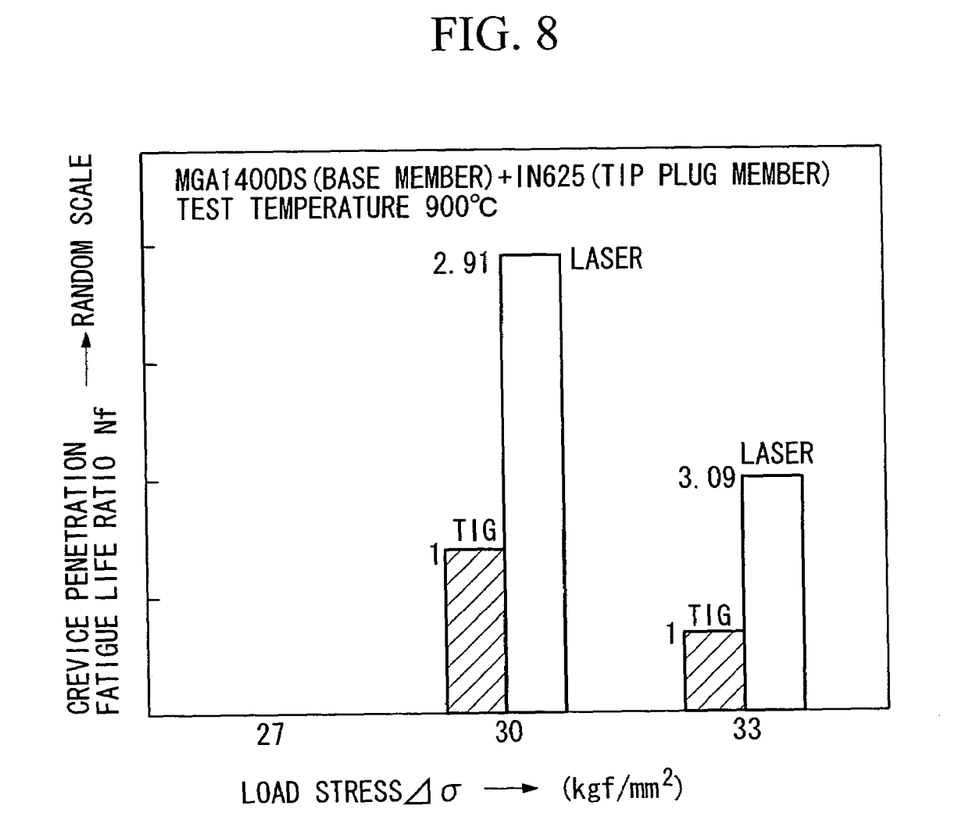
FIG. 8 is a graph showing a crack and penetration fatigue life Nf (cycle) under condition of load stress $\Delta\sigma$ (kgf/mm$^2$) as a result of fatigue strength test between a welded section in the embodiments according to the present invention and a welded section according to a conventional TIG welding operation.

The result of the crack and penetration fatigue life Nf (cycle) against a load stress $\Delta\sigma$ (kgf/mm$^2$) is shown as a graph in FIG. 8.

Here, in order to ascertain an effect in a method according to the present invention in which the laser butt-welding operation is performed, a test piece is made by plugging the hole 55 by the tip plug 56 by using the <blade tip section 52>, <tip plug 56> having the similar specification to the above explained specification by performing the TIG butt-welding operation. A test for fatigue strength is performed under the similar conditions and the result is shown in a graph in FIG. 8 for so as to compare the results each other.

As clearly understood according to a graph shown in FIG. 8, the crack and penetration fatigue life Nf (cycle) which is observed by performing a method for the laser butt-welding according to the present invention is higher than any load stress $\Delta\sigma$ (kgf/mm$^2$) obtained by a TIG welding method. In addition, the crack and penetration fatigue life Nf (cycle) which is observed in the laser butt-welding method according to the present invention is three times as high as the crack and penetration fatigue life Nf (cycle) according to the TIG welding method. That is, a low cycle fatigue (hereinafter called "LCF") life characteristics improves three times as high as that in a conventional TIG welding method.

Here, the position where the crack occurs in the crack and penetration fatigue life is on a tip of an arc forming curve R section in any case of the above test.

INDUSTRIAL APPLICABITLITY

As explained above, in a method for plugging a hole formed on a blade tip section of a gas turbine blade according to the present invention, factors such as a member for forming a tip plug, a welding condition, an entering heat amount, defocus amount of the laser beam, a dilution ratio for a member for forming a tip plug which is plugged in the blade tip section are preferably set when a tip plug is fit to the hole and the hole is plugged by performing a laser butt-welding operation. Therefore, it is possible to simplify the welding process and also it is possible to prevent the solidification cracking and the liquation cracking in the welded metal reliably.

Also, the hole is plugged by the tip plug by performing the butt-welding operation; therefore, the stress in a direction orthogonal to the longitudinal direction of the blade main body is received in a pulling direction; thus, the strength under the above condition is stronger than the strength in case in which the stress corresponding to the above stress is received in a shearing direction in an attaching welding method. Also, it is possible to improve the LCF fatigue lilfe three times as long as that of the conventional TIG welding method.

Also, in a method for plugging a hole according to the present invention, a method using a laser welding operation is employed. Therefore, it is possible to perform the method by an automation device such as a welding device which is provided with an numerical control (hereinafter called NC) device. Therefore, it is possible to perform the welding process in high accuracy repeatedly in high quality efficiently. Thus, there is an effect in that the product yield increases so as to enhance the production efficiency.

Also, in a method for plugging a hole formed on a gas turbine blade tip section according to the present invention, it is possible to control the size of a space in a butt-welding section in contrast to a conventional case in which there is a problem in that a melting depth changes because attaching welding penetrates the plug.

In the attaching welding operation, it is difficult to adjust the strength in the welded section from a structural point of view because the width in the welded section is approximately uniform when the thickness of the plug changes. In contrast, in the present invention, it is possible to make the melting depth thin if the thickness of the welded section in the butt-welding operation is thin; therefore, it is possible to realize an effect in that it is possible to adjust the strength easily.

Also, in the attaching welding operation, a plug is strengthened by welding the plug to a bottom plate section (55a in FIG. 3) to which the plug is fitted; thus, it is important to control the thickness of the bottom plate appropriately. Thickness in such a bottom plate depends on a position of a core which is used in a process for casting a blade. That is, there is a problem in that it is difficult to control the thickness of the bottom plate because this thickness dimension may become thick or thin. In contrast, according to a method for the butt-welding operation, it is possible to maintain the strength in the butt-welded section; therefore, it is not necessary to control the thickness of the bottom plate.

In an inspection for a defect of the welded section in which a film is disposed outside of the blade and emitting an X-ray from inside the blade, it is not possible to find a defect by the X-ray inspection method because there is no thickness difference in the attaching welding operation. However, in contrast, according to a method for the butt-welding operation according to the present invention, it is possible to find a defect because there is a thickness difference. Therefore, it is possible to maintain the performance of the gas turbine blade more easily; thus, there is an effect in that it is more advantageous from a cost point of view than in a case of the attaching welding operation.

What is claimed is:

1. Method for plugging a hole on a tip of a gas turbine blade comprising steps of:

fitting a tip plug in a hole formed on a tip of the turbine blade, to provide a butting section between the tip plug and the tip of the turbine blade;

performing a butt-weld at the butting section between the tip plug and the tip of the turbine blade by using a laser beam; and plugging the hole.

2. Method for plugging a hole on a tip of a gas turbine blade according to claim 1 wherein a space in a butting section between the hole and the tip plug is no more than 0.2 mm.

3. Method for plugging a hole on a tip of a gas turbine blade according to claim 1 wherein the tip plug is made of a member made of an alloy having the composition: Cr: 21 to 23 weight %, Mo: 8 to 10 weight %, the rest of the alloy being Ni.

4. Method for plugging a hole on a tip of a gas turbine blade according to claim 1 wherein a condition for butt-welding is such as output: 500 to 900 W, pulse width 10 to 15 ms, repetition: 30 to 60 pps, Duty 30 to 90%, velocity: 0.5 to 1.3 m/min, and entering heat 34 to 60 kJ/m.

5. Method for plugging a hole on a tip of a gas turbine blade according to claim 4 wherein a defocusing amount of the laser beam is 0 to −1.0 mm in a butt-welding operation for welding a tip plug on a hole by a laser beam.

6. Method for manufacturing a gas turbine blade according to claim 1 wherein:

the laser beam is a YAG laser beam; and an Argon gas is used for a shield gas.

* * * * *

UNITED STATES PATENT AND TRADEMARK OFFICE
CERTIFICATE OF CORRECTION

PATENT NO. : 6,984,801 B2  Page 1 of 1
DATED : January 10, 2006
INVENTOR(S) : Mega et al.

It is certified that error appears in the above-identified patent and that said Letters Patent is hereby corrected as shown below:

<u>Title page,</u>
Item [75], should read:
-- [75] Inventors:  Masahiko Mega, Hyogo-ken (JP);
Koji Takahashi, Hyogo-ken (JP);
Yoshitaka Uemura, Hyogo-ken (JP);
Kengo Yamaguchi, Hyogo-ken (JP);
Masaya Kanikawa, Hyogo-ken (JP);
Shuho Tsubota, Hyogo-ken (JP);
Ken Fujita, Hyogo-ken (JP);
Toshihiko Tsunatani, Hyogo-ken (JP);
Minoru Ohara, Hyogo-ken (JP) --.

Signed and Sealed this

Eleventh Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,984,801 B2
DATED : January 10, 2006
INVENTOR(S) : Mega et al.

It is certified that error appears in the above-identified patent and that said Letters Patent is hereby corrected as shown below:

<u>Title page,</u>
Item [75], should read:
-- [75] Inventors: Masahiko Mega, Hyogo-ken (JP);
                Koji Takahashi, Hyogo-ken (JP);
                Yoshitaka Uemura, Hyogo-ken (JP);
                Kengo Yamaguchi, Hyogo-ken (JP);
                Masaya Kanikawa, Hyogo-ken (JP);
                Shuho Tsubota, Hyogo-ken (JP);
                Ken Fujita, Hyogo-ken (JP);
                Toshihiko Tsunatani, Hyogo-ken (JP);
                Minoru Ohara, Hyogo-ken (JP) --.

Signed and Sealed this

Sixteenth Day of May, 2006

JON W. DUDAS
*Director of the United States Patent and Trademark Office*